US012123686B2

(12) United States Patent
Coyle et al.

(10) Patent No.: US 12,123,686 B2
(45) Date of Patent: Oct. 22, 2024

(54) DYNAMIC UNMANNED THREAT EMITTER

(71) Applicant: Government of the United States, as represented by the Secretary of the Air Force, Wright-Patterson AFB, OH (US)

(72) Inventors: David Coyle, Surprise, AZ (US); Daniel Treece, Buckeye, AZ (US); Wylie Standage-Beier, Phoenix, AZ (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 317 days.

(21) Appl. No.: 17/653,294

(22) Filed: Mar. 3, 2022

(65) Prior Publication Data
US 2022/0281477 A1 Sep. 8, 2022

Related U.S. Application Data

(60) Provisional application No. 63/155,790, filed on Mar. 3, 2021.

(51) Int. Cl.
*F41J 2/00* (2006.01)
*G09B 9/54* (2006.01)
*B60W 50/14* (2020.01)

(52) U.S. Cl.
CPC ........ *F41J 2/00* (2013.01); *G09B 9/54* (2013.01); *B60W 50/14* (2013.01); *B60W 2540/215* (2020.02)

(58) Field of Classification Search
CPC ....... F41J 2/00–02; G09B 9/54; B60W 50/14; B60W 2540/215
See application file for complete search history.

(56) References Cited

U.S. PATENT DOCUMENTS

| | | | | |
|---|---|---|---|---|
| 4,729,737 A | * | 3/1988 | Reagan | G09B 9/085 434/33 |
| 9,481,475 B2 | | 11/2016 | Campillo et al. | |

(Continued)

OTHER PUBLICATIONS

D. R. Kuechenmeister et al. "Reprogrammable threat radar emitter simulations using real-time, closed-loop software models," Proceedings of the IEEE 1997 National Aerospace and Electronics Conference. NAECON 1997, Dayton, OH, USA, 1997, pp. 571-579 vol.2, doi: 10.1109/NAECON.1997.622700. (Year: 1997).*

*Primary Examiner* — Matthew M Barker
(74) *Attorney, Agent, or Firm* — AFMCLO/JAZ; Jeffrey V. Bamber

(57) ABSTRACT

A threat emitter system comprising a threat emitter comprising a main power supply, an external power source, a first sequencer, a driver amp, a second sequencer, a main amp, and a radio; a three-way power supply; a mixer, synthesizer, pre-amp, and cooling fans receiving electrical power from the three-way power supply; and an antenna in communication with the main amp; a user interface in communication with radio; the radio in communication with the mixer; the mixer in communication with the synthesizer; a filter in communication between the mixer and the pre-amp; the driver amp in communication with the pre-amp; the first sequencer in communication with the driver amp; the driver amp in communication with the main amp; a second sequencer in communication with the main amp; and a processor with access to a memory storing instructions executable by the processor.

4 Claims, 7 Drawing Sheets

(56) References Cited

U.S. PATENT DOCUMENTS

| | | | |
|---|---|---|---|
| 10,486,699 B2 | 11/2019 | Lu et al. | |
| 10,796,204 B2 | 10/2020 | Rohani et al. | |
| 10,969,467 B1 * | 4/2021 | Dunn | H04W 12/79 |
| 11,006,564 B2 | 5/2021 | Foster et al. | |

* cited by examiner 40 38

DYNAMIC UNMANNED THREAT EMITTER

Pursuant to 37 C.F.R. § 1.78(a)(4), this application claims the benefit of and priority to prior filed Provisional Application Ser. No. 63/155,790, filed 3 Mar. 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to frequency emissions equipment and, more particularly, to a dynamic unmanned threat emitter.

BACKGROUND OF THE INVENTION

The purpose of this invention is to supplement training ranges with a threat replication system that is not only low cost and capable of being fielded in numbers, but one which also rapidly deployable and dynamic. In a 2018 report to Congress, the Secretary of the Air Force stated that the Air Force has an urgent need for higher-fidelity threat simulators with advanced characteristics. According to a recent DoD IG audit of INDOPACOM training ranges supporting aviation units, to include the Joint Pacific Alaska Range Complex (JPARC), found that many of the ranges were antiquated and unable to prep units for conventional warfare. The JPARC complex replicates cold war missile systems from the 1980's, however, these systems are not capable of representing a modern near-peer threat. According to the investigators, the Air Force's F-22s and F-35 jets don't even view these systems as threats—modern aircraft technology is now more advanced than range electronic warfare systems. These shortfalls are not exclusive to just INDOPACOM training ranges; in the case of Luke Air Force Base, the Barry M. Goldwater training range currently only has four static threat emitters to train pilots on a daily basis.

While most systems that are currently utilized on training ranges are older and capable of only limited threat replication, there are newer systems being marketed which allow for replication of multiple systems. The primary limitations of both systems however, are that they are limited in mobility, typically require significant infrastructure to support operations, and are cost prohibitive, i.e. they can't be fielded in large quantities. In order to create a realistic threat scenario with the current systems on the market, it would cost upwards of a $100M to resource just one training range with the appropriate number of systems.

SUMMARY OF THE INVENTION

The present invention overcomes the foregoing problems and other shortcomings, drawbacks, and challenges of creating a training environment for our pilots and aircraft that provides simulated representations of threats from countries listed in the National Defense Strategy. While the invention will be described in connection with certain embodiments, it will be understood that the invention is not limited to these embodiments. To the contrary, this invention includes all alternatives, modifications, and equivalents as may be included within the spirit and scope of the present invention.

The low-cost threat emitter seeks to address all of these limitations, especially in the case of mobility, quantity, and capability to replicate multiple different threats. The form factor of the low-cost threat emitter is such that it can easily be moved around in a light truck, on a trailer, or autonomously, and it may be easily assembled/disassembled within minutes. Compared to the systems currently in use, this is a significant improvement; many of the current systems require heavy equipment to move to a new location, and often times may be accomplished in a time period on the order of hours and/or days, not minutes. Additionally, by taking advantage of newer generation avionics in our modern military aircraft, the low-cost inventive emitter requires much less power to operate resulting in inherently lower production costs. By comparison, the low-cost emitter is expected to be about $1/50^{th}$, i.e. about 2%, of the cost of current systems, thus allowing multiple systems to be fielded at a fraction of the cost. Lastly, because the low-cost threat emitter will take advantage of software-defined commercial off-the-shelf equipment (COTS), the system is reprogrammable by the operator or autonomously and will be capable of replicating various different threats by simply updating operating parameters. The threat environment may be changed within seconds.

According to one embodiment of the present invention, a threat emitter system comprises a threat emitter including a main power supply in communication with an external power source; a first sequencer receiving electrical power from the main power supply; a driver amp receiving electrical power from the main power supply; a second sequencer receiving electrical power from the main power supply; a main amp receiving electrical power from the main power supply; and a radio receiving electrical power from the main power supply;

a three-way power supply receiving electrical power from the main power supply and supplying three distinct DC voltages; a mixer receiving electrical power from the three-way power supply; a synthesizer receiving electrical power from the three-way power supply; a preamp receiving electrical power from the three-way power supply; and at least two cooling fans receiving electrical power from the three-way power supply; and an antenna in communication with the main amp;

a user interface in communication with radio; the radio in communication with the mixer; the mixer in communication with the synthesizer; a filter in communication between the mixer and the pre-amp; the driver amp in communication with the pre-amp; the first sequencer in communication with the driver amp; the driver amp in communication with the main amp; a second sequencer in communication with the main amp; and a processor with access to a memory storing instructions executable by the processor, the instructions including: driving a waveform power (dB) to a selected value; driving a waveform frequency at a selected value; driving a waveform bandwidth at a selected value; driving a waveform pulse duration at a selected value; and driving a waveform pulse repetition interval at a selected value.

According to a first variation, the threat emitter system further comprises a host vehicle on which the threat emitter is mounted.

According to another variation, the host vehicle is an autonomous host vehicle, the autonomous host vehicle comprising a processor with access to a memory storing instructions executable by the processor, the instructions including: determining that an autonomous host vehicle can traverse an environmental obstacle that includes at least one topographical feature that is a solid object or a land formation; and as a result of determining that the autonomous host vehicle can traverse the at least one topographical feature: controlling an active suspension system in accordance with the at least one topographical feature, and controlling the autonomous host vehicle to traverse the at least one topographical feature; and receiving a user input authorizing the autonomous host vehicle to traverse the at least one topographical feature.

According to another variation, the instructions for controlling the active suspension include to adjust one or more wheels of the host vehicle individually to traverse the at least one topographical feature.

This system allows us to replicate signals present in an "air defense network," rather than just single threats placed on the training range, and allows for the generation of more-realistic training scenarios. Air defense networks are comprised of multiple surface-to-air-missile systems that work together to defend a defined area. The individual systems may move about the battlespace to complicate targeting solutions. In order to support follow-on military operations such as airborne intercept missions to destroy strategic targets, the military must first conduct suppression of enemy air defense missions, or SEAD. These SEAD missions involve finding, fixing, targeting, and tracking threats such as surface-to-air missile systems. The inventive Low-Cost-Threat Emitter or LCTE, emulates detectable signatures to support training for SEAD missions on a much greater scale due to the rapid reprogammability, mobility, and the ability to field many systems due to the low cost and small size. The host vehicle permits the threat emitter system to move around an area, providing unpredictability while providing a broad range of simulated threat emissions, greatly enhancing aircrew training.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
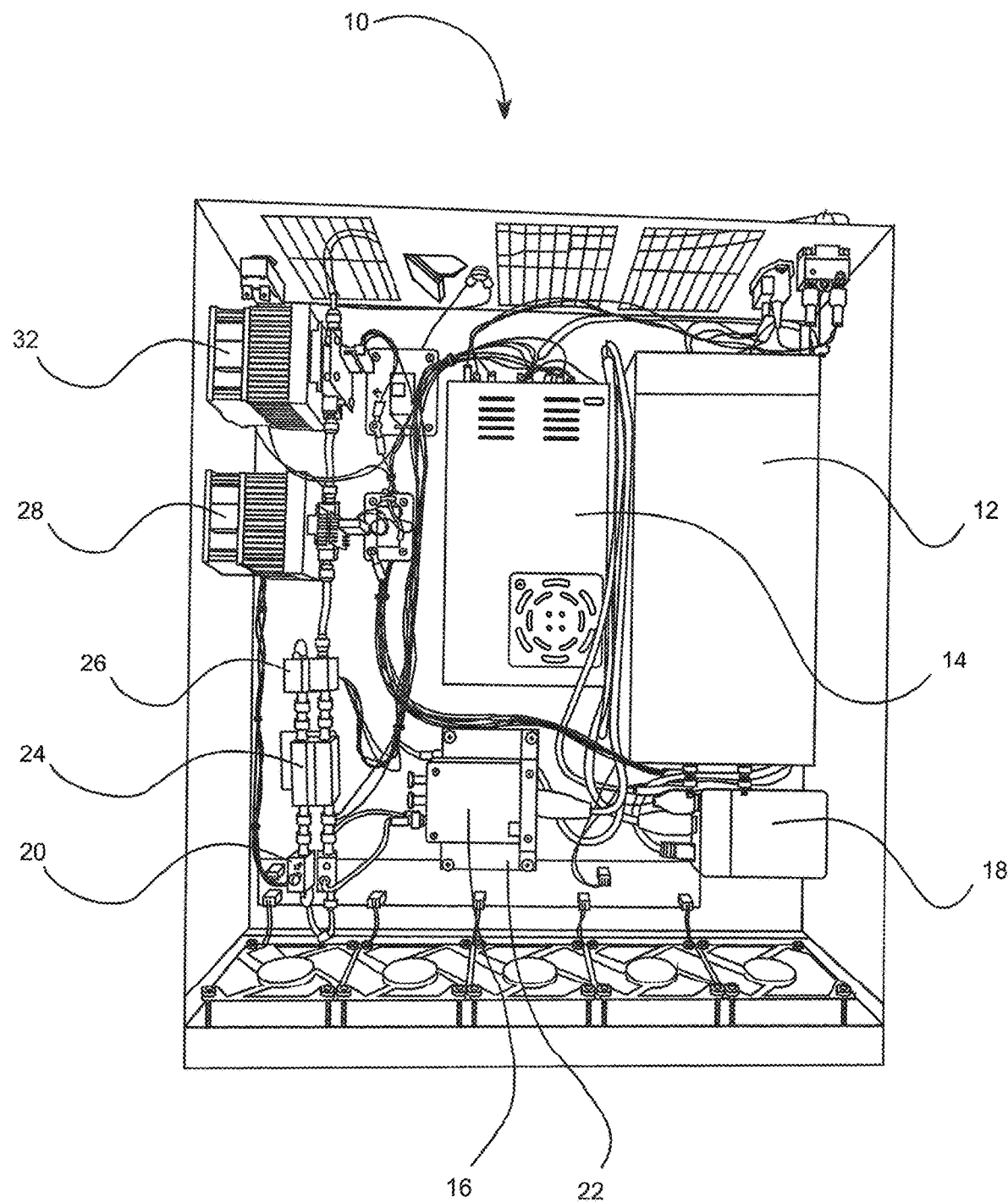
FIG. 1 is an elevated view of a portion of the threat emitter, according to an embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

In one embodiment, as depicted in FIGS. 1-5, the low-cost threat emitter 10 may be an X-band radar threat simulator designed to replicate various surface-to-air missile systems operating from 7.95-11 GHz. Other frequency bands may be employed as well, depending on the desired application of the emitter 10. The system may make use of multiple components consisting of, for example, a main power supply 12, e.g. a 27v DC power supply, a three-way power supply 14 (3.3vdc, 5vdc, 12vdc), a software-defined radio 16, open-source software 18 for the radio 16, custom software 18 combined with a web-based user interface 38, a synthesizer 22, a mixer 20, a filter 24, a pre-amplifier 26, amplifier sequencers 30, driver amp 28, main amp 32, and finally the transmit antenna 34. One or more of each of these components may be included depending on the particular application and desired results.

Component Descriptions:

In one embodiment, the main power supply 12 is a Mean Well SP-750-27 Power Supply. This power supply may be employed as the main power source for both amplifiers 28, 32, and which is connected via the amplifier sequencers 30. Additionally, it may also serve as the power supply for the three-way power supply 14. The energy necessary to drive the main power supply 12 may be from a typical 110v AC external power supply, e.g. portable generator, batteries, or other source, connected via a standard power cable (not shown). Other power arrangements, e.g. dedicated generator or batteries, are acceptable within the limits of the power requirements of the system and the desired performance characteristics.

The 3-way power supply 14 may be a Mean Well QP200-3A Power Supply or similar power supply. This three-way power supply may serve as the power source for several components throughout the system, including 3.3vdc for the Mixer 20; 5vdc for the pre-amp synthesizer 22; 12vdc for the Driver Amp Fan 29, Main Amp Fan 33; and additional cooling fans mounted on chassis.

The radio 16 may be an E310 Software-Defined Radio (SDR). The software-defined radio is flexible radio platform offering digital waveform control over a wide frequency range from 70 MHz-6 GHz with up to 56 MHz of instantaneous bandwidth. The system features an onboard Open Embedded build framework based on the Linux operating system. An open source software platform, e.g. GNU Radio, may be used to build the waveform parameters by combining it with custom software 18, generating a python script which allows select fields to be programmed by an end user. These parameters include frequency, power output, pulse repetition interval, staggered pulse repetition interval, pulse duration, and modulation. Once parameters have been established, a python script is created which the embedded software 18 uses to control the waveform generation of the radio 16. This waveform is the initial input frequency (IF) which is then output to the mixer 20 where it is mixed with a local oscillator (LO) tone generated by the synthesizer 22. A user interface 38 to control the radio's parameters may be accomplished through a graphical user interface 38, accessed via a secure Wi-Fi network created by the radio 16, 36, as described below.

The Graphical User Interface (GUI) 38 is used to control the software 18 on the radio 16, and the basis for waveform generation, is a web-based interface which allows for user inputs to define waveform parameters. The GUI 38 may be accessed via a secure Wi-Fi network established by the radio 16 and an in communication through a wireless interface device, such as a tablet 40, e.g. an Amazon Fire tablet, or alternatively by connection to a closed network, from which the GUI 38 can be accessed by any computers connected to the same network. Once there is a secure connection, the user is then able to access the GUI 38 by loading an HTML based-interface using the web browser loaded on the tablet 40 or network connected computer; from this interface the user is able to define parameters for waveform generation as noted above, to include power (dB), frequency, bandwidth, pulse duration, pulse repetition interval, modulation, and other parameters. After input of the parameters is complete, a command is sent from the web-based interface to the embedded software to generate the python script for waveform generation. A start/stop transmit function is also controllable via this access point. As for the interface, it is a website which is hosted on the computer inside the main box (labeled computer in FIG. 1) and may be accessed through a network connection to the computer through either Wi-Fi or Ethernet. Once a network connection with the threat emitter is established, the user simply has to input the correct IP address to access the parameter entry webpage.

The synthesizer 22, e.g. a Walfront ADF4351 Synthesizer, is a microcontroller board which uses an integrated voltage controlled oscillator with a frequency range of 2.2-4.4 Ghz. The synthesizer is used as a LO (local oscillator) to mix with the IF (input frequency) generated by the SDR 16 in order to get the signal up to the desired frequency range of 7.95 GHz-11 GHz. The typical LO signal configuration is set to have the synthesizer generate a 3.5 GHz tone; this signal generation is controlled by the embedded software 18 on the SDR 16, connected by USB. The 3.5 GHz tone is then sent to the mixer 20 to be combined with the IF frequency.

The mixer 20, e.g. a Lotus MIX2G14G500M6G Mixer, is responsible for receiving both the IF and the LO signals. The primary purpose of the mixer 20 is to complete the up-conversion of those signals in order to arrive at 7.95-11 GHz. The mixer 20 receives the LO input, doubles it, and then combines it with the IF to arrive at the final operating frequency. For example, the LO frequency is set to 3.5 GHz which arrives at the mixer 20, the mixer doubles that to arrive at 7 GHz, the mixer then combines the 7 GHz tone with the 2 GHz IF generated by the SDR 16 to arrive at 9 GHz. Once the doubling of the LO, and then the mixing with the IF occurs, the output is then passed through a filter 24.

There may be two filters 24 associated with this system which are designed to be interchangeable depending on the operating frequency. A Marki FB-0860 filter is designed to operate between 7.95-9.25 GHz and is centered at 8.6 GHz. A Marki FB-0955 filter is designed to operate between 8.9-10.2 GHz and is centered at 9.55 GHz. These filters 24 will be swapped into the system depending on which frequency is being utilized. A filter 24 will receive input from the mixer 20 at the resultant frequency output by mixing the LO and IF, and will allow for clean passage of intended replication signal at the specified parameters. The filtered output frequency will then pass to the first pre-amp 26.

The pre-amp 26, e.g. Lotus MPA5G18G 18dB pre-amp, is the first stage amplifier which operates from 5-18 GHz. It takes the output signal from the filter 24, amplifies it to a power level high enough for the 2 watt driver amp 28 to receive the input signal.

The sequencers 30, 31, e.g. Xsystor 640EP2R0AL20 & 620EP2R0AL20 Sequencers, receive 27 vdc from the main power supply 12 in the chassis and provide power biasing gates to power both the driver amp 28 and the main amp 32. The sequencers 30, 31 are switched on prior to any RF being transmitted, and are powered down only after all RF has been shut off; proper sequencing of power to the amplifiers 28, 32 is required to prevent power saturation.

The driver amp 28, e.g. Qorvo TGA2598-SM Driver Amp, operates from 6-12 GHz with a max output rating of 2 watts. The driver amp 28 receives the signal from the pre-amp 26 and serves as a driver amp for the main amplifier 32. The output from the driver amplifier 28 is approximately 1 watt, which will then be output to the main amplifier 32.

The main amplifier 32, e.g. Qorvo TGM2635-CP Main Amp, is the final amplifier in the signal chain and operates from 7.9-11 GHz with a max power rating of 100 watts. The main amp 32 receives the input signal from the driver amplifier 28 and amplifies it to the final output power. The main amplifier 32 has a duty cycle limitation of 10%, thus limiting average output power to approximately 10 watts. The 10 watt signal is then passed from this amplifier 32 to the final component in the system, the transmit antenna 34, e.g. parabolic dish.

The transmit antenna 34, e.g. Q-par QMS-00807 30dBi Antenna, is final component of the system, and may be a parabolic dish which operates from 6.5-18 GHz. The antenna 34 receives the final signal from the main amplifier 32 in the signal chain and creates a beam with approximately 6° of beamwidth and approximately 37-40 dBW effective isotropic radiated power, completing the final stages of operation.

The antenna 34 may be configured to elevation offset (in degrees from horizon) for initial scan start point. From the original offset point, the antenna 34 may be directed to scan in 5°/10°/15° steps in elevation to cover higher elevations. The antenna 34 may step through the selected scan increment up to roughly 60° in elevation and then scan back down to the initial elevation selection. While the antenna 34 is scanning in elevation, it is concurrently scanning in azimuth. The antenna may be set to scan in azimuth up to +/−90° from antenna boresight. This allows the user to select the scan size in azimuth based upon desired area of coverage. What results is a pseudo "raster scan" in which the antenna 34 is covering a large sector of airspace, thus mitigating the need to aim the antenna directly at the intended receiver; this significantly simplifies the use of the system, while increasing the probability of detection by aircraft or other systems. Overall the antenna can cover about 60° of azimuth/second and steps in elevation approximately every second.

The preferred embodiment of the system is a ruggedized, portable system which is capable of rapid mobility and reconfiguration, providing the end user a flexible training aid for the aircrew training. The mobility of the system may be in the form of an autonomous vehicle that transports the threat emitter 10 around a defined area. Numerous autonomous vehicles systems may be included with the threat emitter system 10, including U.S. Pat. No. 10,486,699 to LU et al. (Off-Road Autonomous Driving); U.S. Pat. No. 11,006, 564 to Foster et al. (Path Planning System For Autonomous Off-Road Vehicles); U.S. Pat. No. 10,796,204 to Rohani et al. (Planning System and Method For Controlling Operation of an Autonomous Vehicle to Navigate a Planned Path), each of which is fully incorporated by reference.

The system 10 is designed to replicate and emit threat signals, and facilitate aircrew training through the Find, Fix, Track, Target cycle. Due to the low-cost nature of these emitters, multiple emitters may be deployed simultaneously to confuse targeting and simulate a more realistic threat environment.

The design of the low-cost emitter 10 is very flexible, allowing modular changes for end user needs. If the frequency band for transmission requires something than the current configuration, replacing the amplifier chain to meet pre-determined requirements is easily achievable. Beyond the applications of a low-cost threat emitter, the system 10 has many different potential applications—replication/creation of almost any type of waveform is within the realm of possibility taking advantage of SDR technology and combining with COTS equipment.

Vehicle suspension systems make traversing certain offroad environmental obstacles more manageable. For example, a fully active suspension can adjust various dynamic characteristics for off-road driving purposes.

Examples of such characteristics include ride height, stiffness of the suspension springs, damping rates of the shock absorbers, rigidness of the anti-roll bars, characteristics of body mounts, the relative position between each individual wheel and the vehicle body, etc. Fully active suspension systems can benefit from data captured via sensors. That is, the suspension system can adopt particular characteristics based on the environmental obstacles detected by the sensors. Moreover, the vehicle itself can assess the environmental obstacle relative to the capabilities of the vehicle to determine whether the vehicle can traverse the environmental obstacle. The vehicle may, in some possible situations, determine whether it should attempt to traverse the environmental obstacle without passengers.

For example, if traversing a particular obstacle is within the capabilities of the vehicle but could cause a roll-over, the vehicle may alert the passengers of the risk and ask the passengers to exit the vehicle. The vehicle may autonomously traverse the environmental obstacle after the passengers have exited the vehicle. An example vehicle control system, that could be incorporated into an autonomous host vehicle to carry out such actions, includes a processor with access to a memory storing instructions executable by the processor. The instructions include determining whether an autonomous host vehicle can traverse an environmental obstacle, and if the autonomous host vehicle can traverse the environmental obstacle, controlling an active suspension system in accordance with the environmental obstacle and controlling the autonomous host vehicle to traverse the environmental obstacle.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 2:
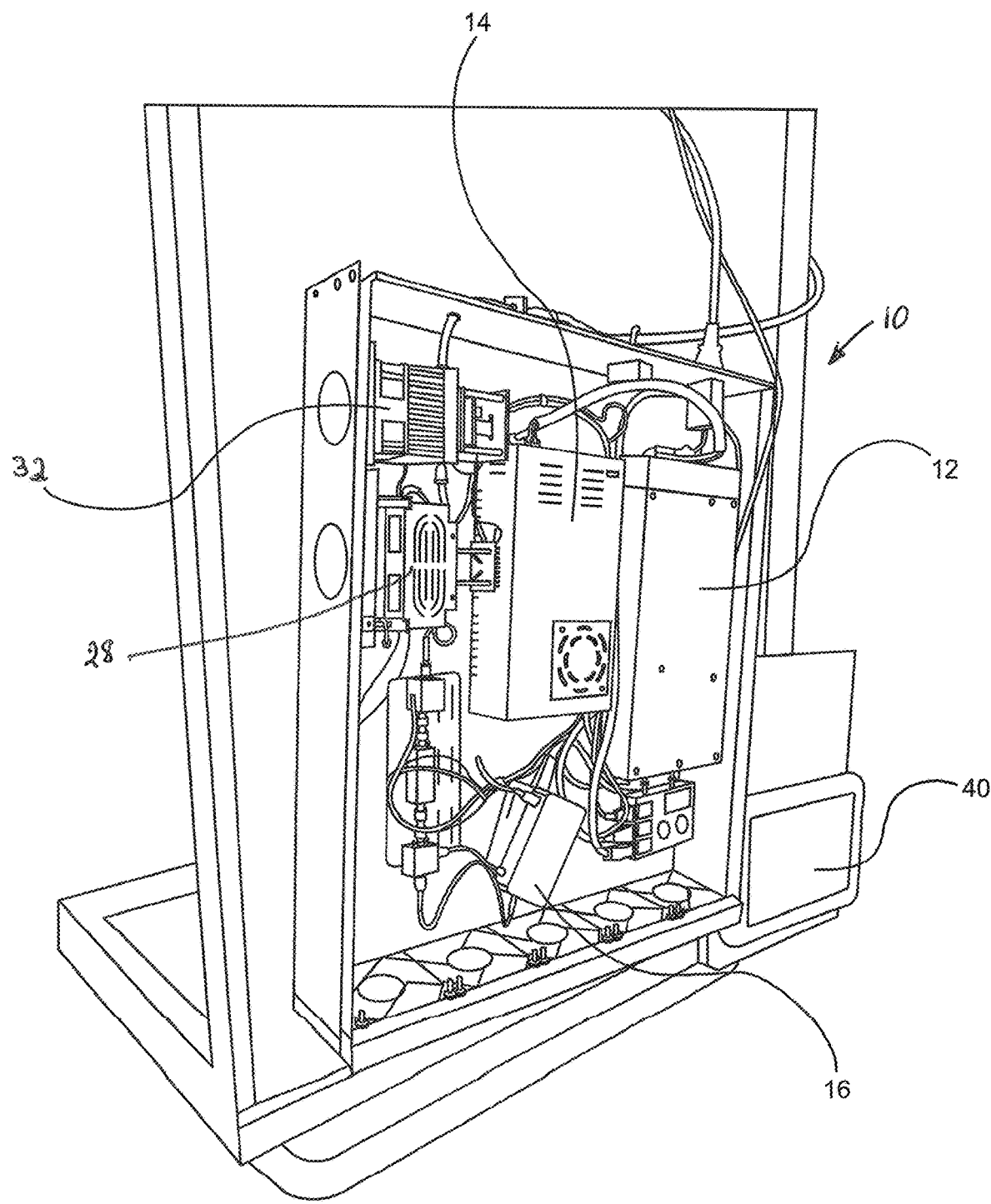
FIG. 2 is a perspective view of a portion of the threat emitter, according to an embodiment of the invention.
Figure 3:
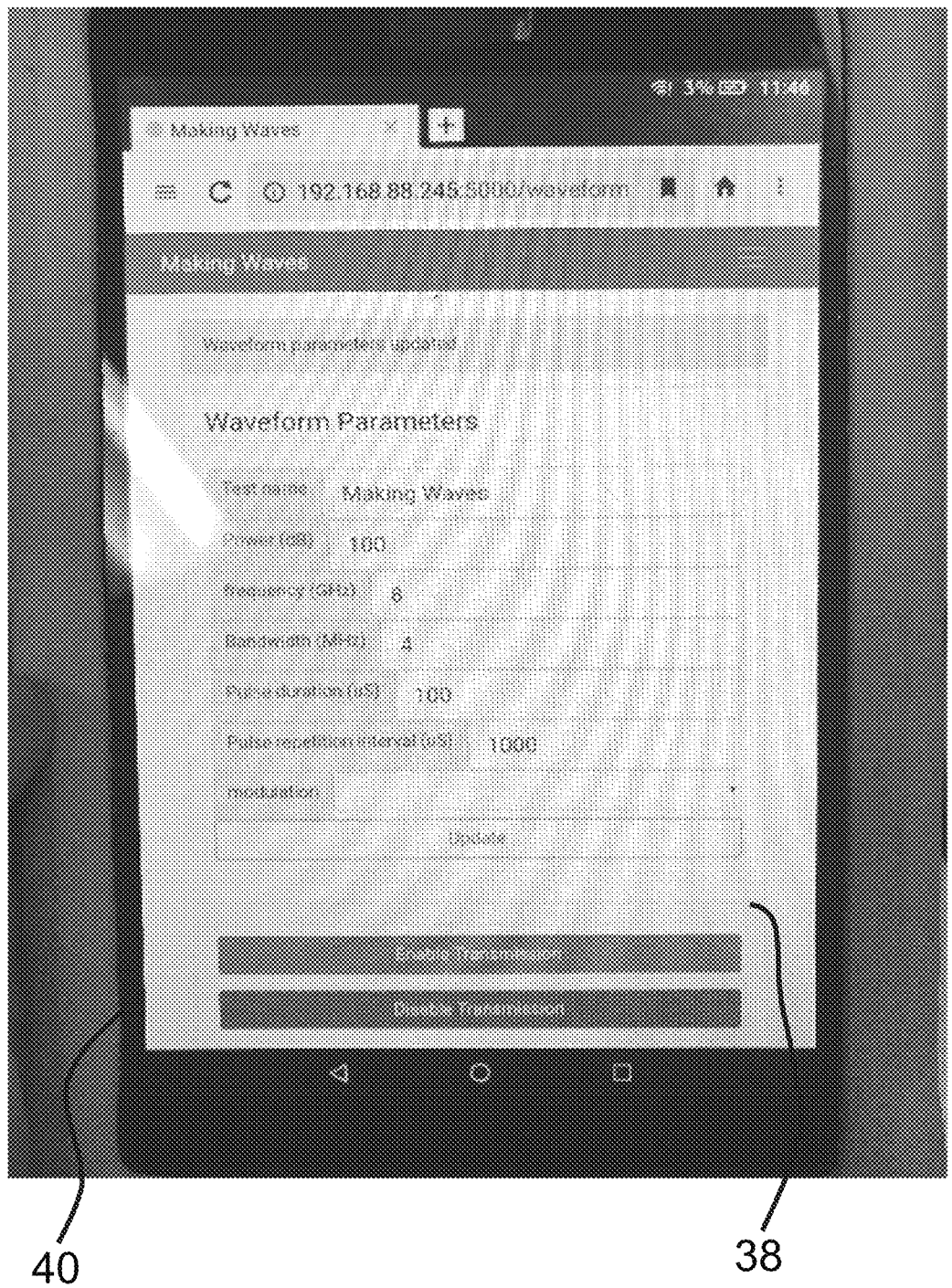
FIG. 3 depicts the user interface for the threat emitter, according to an embodiment of the invention.
Figure 4:
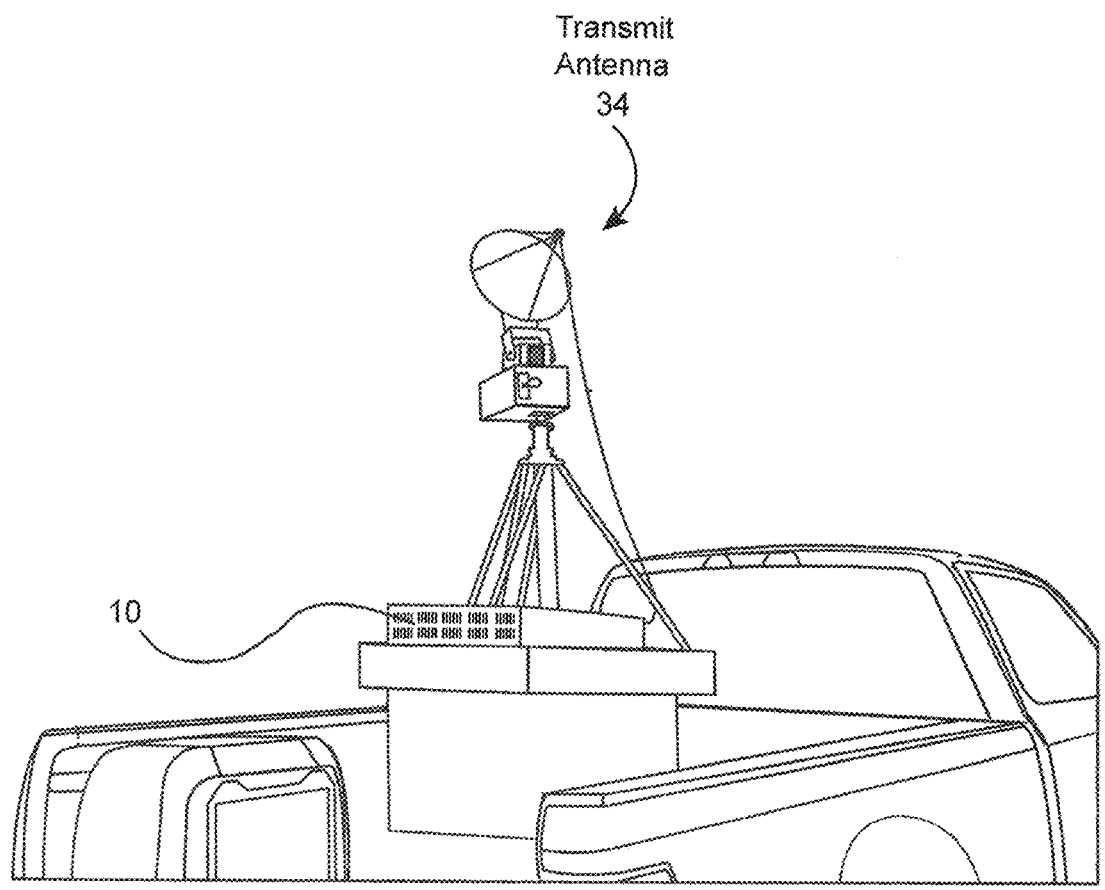
FIG. 4 depicts the threat emitter mounted on a vehicle, according to an embodiment of the invention.
Figure 5:
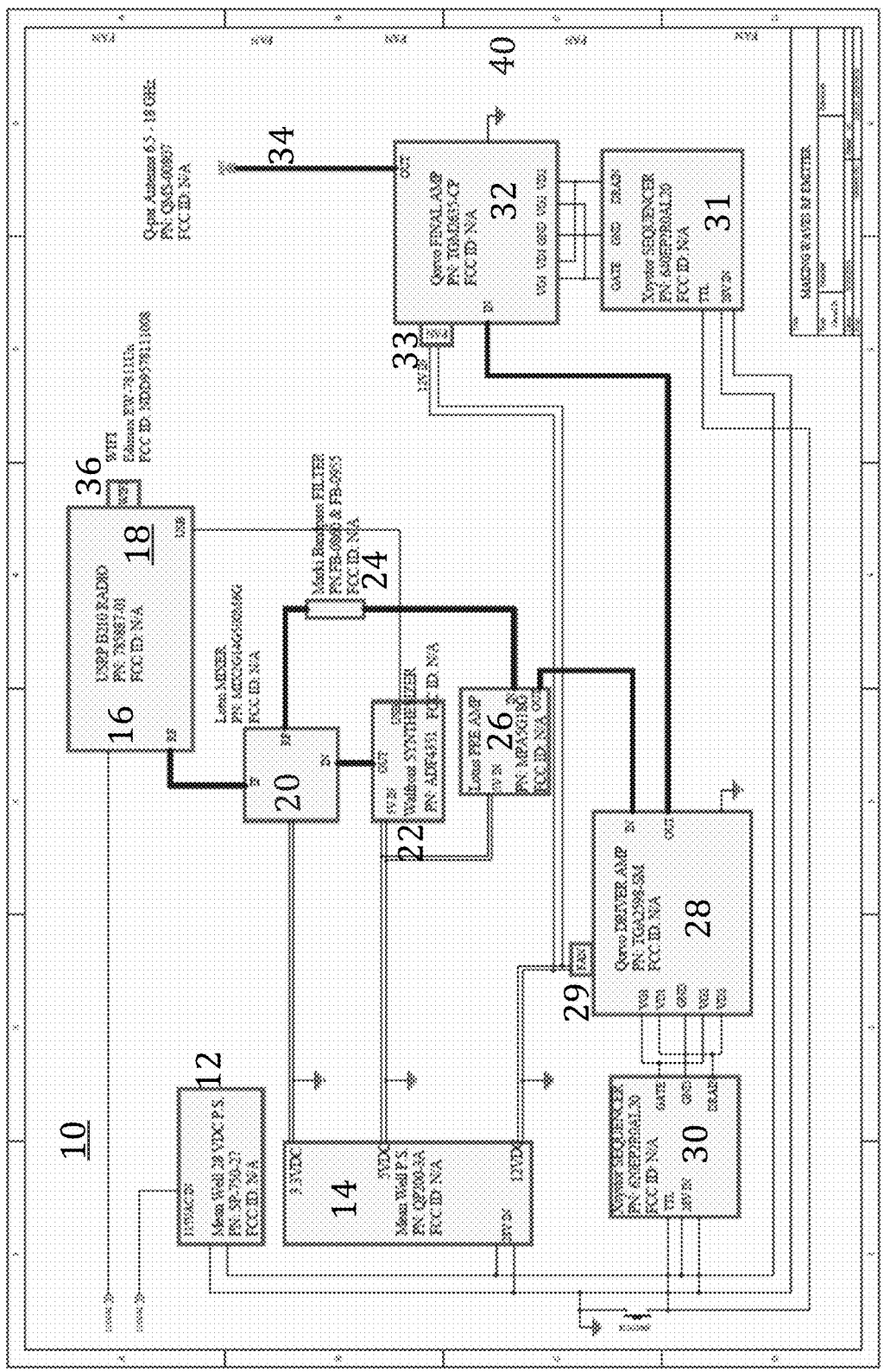
FIG. 5 presents an electrical schematic for the threat emitter, according to an embodiment of the invention.
Figure 6:
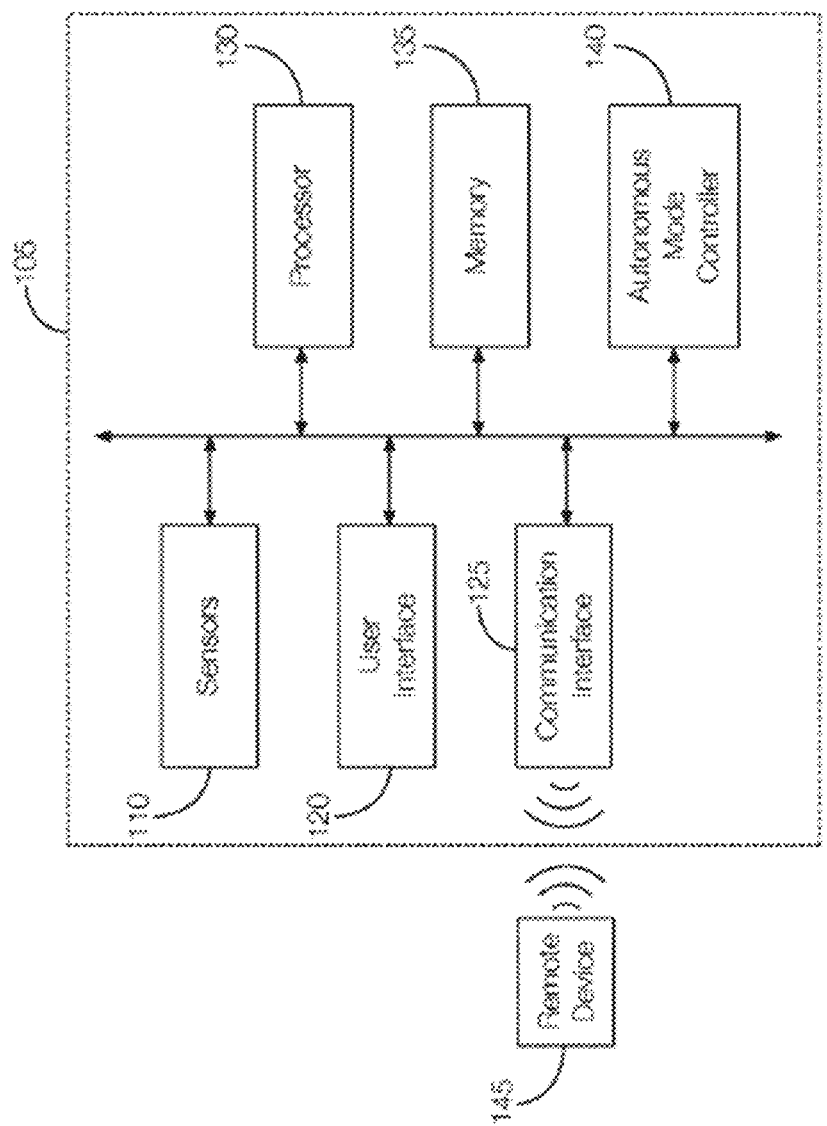
FIG. 6 is a block diagram showing example components of the system, according to an embodiment of the invention.

FIG. 2 illustrates example components of the vehicle system 105. As shown, the vehicle system 105 includes the sensors 110 (briefly discussed above, and discussed in greater detail below), a user interface 120, a communication interface 125, a processor 130, a memory 135, and an autonomous mode controller 140. The vehicle system 105 need not include all of these components, however. The vehicle system 105, for example, could include more, fewer, or different components than those shown and described.

The sensors 110 include any number of electronic circuits and other electronic components that capture information about the area around the host vehicle 100. Examples of sensors 110 include lidar sensors, radar sensors, ultrasonic sensors, cameras, or any combination thereof. Any number of sensors 110 may be incorporated into the host vehicle 100, and different sensors 110 may be of the same or different type relative to the others, if any, incorporated into the host vehicle 100. The sensors 110 are programmed to output signals representing the captured information. For instance, when implemented via lidar, radar, and cameras, the output of the sensor 110 includes image data. In some instances, the sensor 110 is programmed to detect environmental obstacles. This could be through image processing performed by the electronic control unit inside or outside the sensor 110. In such instances, the sensor 110 may output an obstacle detection signal indicating the presence of the environmental obstacle. The obstacle detection may include other data as well, such as characteristics of the environmental obstacle. Other types of sensors 110 that may be used to detect environmental obstacles could include a rain sensor, a road condition sensor, a tire pressure sensor, a height sensor, a steering wheel sensor, wheel speed sensors, longitudinal and lateral acceleration sensors, accelerator and brake pedal sensors, or the like.

The user interface 120 includes any number of electronic circuits and other electronic components that present information to, and receive user inputs from, the vehicle passengers. For instance, the user interface 120 may include a touch-sensitive display screen located in the passenger compartment of the host vehicle 100. The user interface 120 is programmed to receive signals from, e.g., the processor 130 and present information to the vehicle passengers in accordance with the signals received. Moreover, the user interface 120 is programmed to output signals representing user inputs. The signals may be output to, e.g., the processor 130 or other components of the vehicle system 105.

The communication interface 125 includes any number of electronic circuits and other electronic components that wirelessly transmit signals. The communication interface 125, for example, includes an antenna. The communication interface 125 is programmed to receive signals from the processor 130 and transmit those signals to nearby devices. Further, the communication interface 125 may receive signals from remote devices 145 and transmit those signals to, e.g., the processor 130, the autonomous mode controller 140, or the like.

The processor 130 may include any number of electronic circuits and other electronic components that control certain operations of the vehicle system 105 and possibly contribute to the control of other systems such as the active suspension system 115, the autonomous mode controller 140, or the like. For example, the processor 130 receives the signals output by the sensors 110. The processor 130 may receive the image data, the obstacle detection signal, or both. From the output of the sensor 110, the processor 130 determines whether the host vehicle 100 can autonomously traverse the environmental obstacle and whether the passengers should exit the host vehicle 100 prior to attempting to traverse the environmental obstacle. Further, the processor 130 outputs command signals to the active suspension system 115 that command the active suspension system 115 to adopt settings appropriate for the environmental obstacle. The processor 130 also outputs command signals to the autonomous mode controller 140 that will control the host vehicle 100 while traversing the environmental obstacle.

By way of example, the processor 130 may be incorporated into a vehicle dynamics control module that receives various sensor signals, including signals output by a rain sensor, a road condition sensor, a tire pressure sensor, a height sensor, a steering wheel sensor, wheel speed sensors, longitudinal and lateral acceleration sensors, accelerator and brake pedal sensors, or the like. The processor 130 may further receive signals, from an inertial measurement unit, associated with roll rate, yaw rate, pitch rate, longitudinal acceleration, lateral acceleration, and vertical acceleration.

Other types of inputs to the processor 130 include signals generated by a pre-crash sensing system in accordance with radar, lidar, camera, or transponder sensors, signals generated by a navigation system, a vehicle-to-vehicle communication system, or a vehicle-to-infrastructure communication system.

The processor 130 may output various signals to other components of the host vehicle 100. For instance, the processor 130 may output signals to a driver warning system, a powertrain control system, a restraint control module, and a chassis control module. The chassis control module may implement the aforementioned active suspension system 115 by outputting control signals that simultaneously adjust, e.g., the suspension height, the suspension dynamic force, or the like. The restraint control module may control seatbelt pretensioners, interior airbag actuators, curtain airbag actuators, seat controls, roll-over protection bar controls, external airbag actuators, etc. Moreover, in addition to the processor 130, the restraint control module may receive signals from impact crash sensors and interior and occupant sensors.

In response to a detected environmental obstacle, the processor 130 determines whether the host vehicle 100 is capable of traversing the environmental obstacle. This includes identifying the type of environmental obstacles involved (e.g., ditches, large rocks, small rocks, the amount of ground clearance, etc.), the capabilities of the active suspension system 115, the risk factors associated with traversing the environmental obstacle, etc. The processor 130 may compare a quantitative measure of the risk factors to the maximum threshold, the intermediate threshold, or both.

If the risk factors exceed the maximum threshold, the processor 130 commands the user interface 120 to alert the passengers to take a different route. The processor 130 may further output command signals to prevent autonomous and manual operation of the host vehicle 100 through or over the environmental obstacle. The processor 130 may further suggest an alternate route that avoids the environmental obstacle by consulting, e.g., a navigation system.

If the risk factors do not exceed the maximum threshold but exceed the intermediate threshold, the processor 130 commands the user interface 120 to present an alert to the occupants instructing the occupants that the host vehicle 100 cannot be manually driven over or through the environmental obstacle and that the host vehicle 100 will autonomously traverse the environmental obstacle only after all passengers have exited the host vehicle 100. The user interface 120 presents the alert in response to the command from the processor 130, and the alert may include instructions for initiating the autonomous operation of the host vehicle 100 via a remote device 145. When the signal from the remote device 145 is wirelessly received via the communication interface 125, or any other user input, such as a user input provided to the user interface 120, and passed to the processor 130, the processor 130 determines that it has the passenger's authorization to attempt to autonomously traverse the environmental obstacle. The processor 130 may rely on the user input as an indication that the passengers have exited or will exit the host vehicle 100 within a predetermined period of time. The processor 130 may further or alternatively consult an occupant detection system (e.g., seat sensors, interior camera, or the like) to confirm that all passengers have indeed exited the host vehicle 100 prior to initiating the autonomous control over or through the environmental obstacle. To initiate the autonomous control, the processor 130 generates control signals to apply particular settings to the active suspension system 115 based on the type of environmental obstacle detected. Further, the processor 130 generates control signals that command the autonomous mode controller 140 to follow a particular path to traverse the environmental obstacle.

If the risk factors do not exceed the intermediate threshold, the processor 130 commands the user interface 120 to prompt the passengers to select either manual or autonomous control over or through the environmental obstacle. The user input selecting either manual or autonomous control is received via the user interface 120 or the remote device 145 and provided to the processor 130. In response, the processor 130 generates the control signals for the active suspension system 115. If the user input indicates autonomous control, the processor 130 further generates the control signals for autonomous operation of the host vehicle 100 over or through the environmental obstacle.

The memory 135 includes any number of electronic circuits and other electronic components that store data. The data may include the images captured by the sensors 110, data relating environmental obstacles to different active suspension system 115 settings, instructions executable by the processor 130, instructions executable by the autonomous mode controller 140, or the like. The memory 135 may make such data available to the other components of the vehicle system 105.

The autonomous mode controller 140 includes any number of electronic circuits and other electronic components that control the host vehicle 100 in an autonomous or partially autonomous mode. The autonomous mode controller 140 may autonomously control the host vehicle 100 according to the signals output by the sensors 110, the signals output by the processor 130, a navigation system, or any combination of these or other components of the host vehicle 100. The autonomous mode controller 140 is programmed to output command signals to various systems within the host vehicle 100 such as the powertrain, brakes, steering, etc. The command signals output by the autonomous mode controller 140 may, therefore, navigate the host vehicle 100 over or through the environmental obstacle.

Moreover, the autonomous mode controller 140 may autonomously operate the host vehicle 100 according to the settings of the active suspension system 115 determined by the processor 130. That is, the autonomous mode controller 140 may receive a signal representing the particular settings of the active suspension system 115 applied according to the detected environmental obstacle or may access the settings from, e.g., a database stored in the memory 135. With the settings, the autonomous mode controller 140 may autonomously control the host vehicle 100 according to the limitations or advantages of characteristics of the active suspension system 115.

Figure 7:
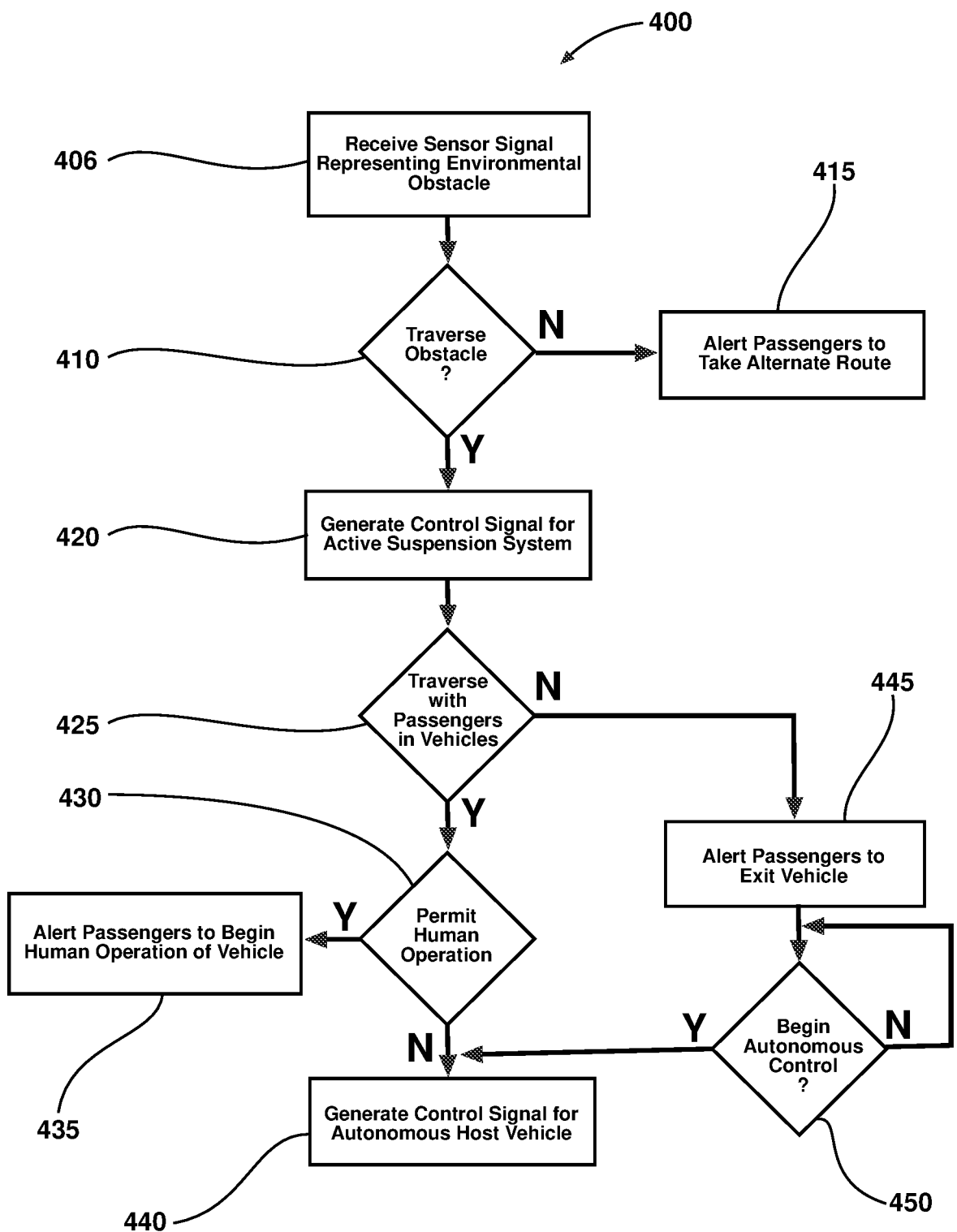
FIG. 7 is a flowchart of an example process that may be executed by the system when faced with an off-road environmental obstacle.

FIG. 7 is a flowchart of an example process 400 that may be executed by the vehicle system 105 to detect and traverse environmental obstacles.

At block 405, the vehicle system 105 receives one or more sensor signals representing environmental obstacles. The sensor signals may be output by one or more of the sensors 110 and may represent the presence of an environmental obstacle. For example, the sensor signal may be generated in response to image processing that detects large rocks (i.e., boulders), stumps, tree trunks, or other large objects, smaller rocks (i.e., smaller than a boulder but individually or collectively larger than the vehicle's ground clearance) or other smaller objects that individually or collectively are larger than the vehicle's ground clearance, or the like. The sensor signals may be received by the processor 130.

At decision block 410, the vehicle system 105 determines whether the host vehicle 100 can traverse the detected environmental obstacle. That is, the processor 130 may consider whether the active suspension system 115 can make the appropriate adjustments to overcome the detected environmental obstacle. This may include the processor 130 predicting the vehicle's path over or through the environmental obstacle while considering factors such as roll-over propensity, traction loss, and other risk factors associated with traversing the environmental obstacle. If the risk factors, as determined by the processor 130, are too high (e.g., quantitatively above a maximum threshold), the process 400 may proceed to block 415. If the risk factors, as determined by the processor 130, are lower (e.g., quantitatively below the maximum threshold), the process 400 may proceed to block 420.

At block 415, the vehicle system 105 alerts the passengers to take an alternate route. That is, the processor 130 may generate the alert and command the user interface 120 to present the alert to the occupants.

At block 420, the vehicle system 105 generates a control signal for the active suspension system 115. The control signals may facilitate traction buildup to, e.g., allow more efficient traction management, including locking the differential and increasing the throttle slightly if the wheels start to spin. Other control signals may increase vehicle articulation, which could include pushing the vehicle wheels down (i.e., raising the chassis), adjust the ride height, and adjust the suspension dampening. Some adjustments, such as adjusting the ride height may be made to the host vehicle 100 as a whole while others may be made only to particular wheels (e.g., adjusting a particular wheel height). Further, the vehicle system 105 may simultaneously output multiple control signals to, e.g., simultaneously actuate the braking, throttle, steering, raising of the wheels, etc.

At decision block 425, the vehicle system 105 determines whether the host vehicle 100 should attempt to traverse the environmental obstacle with passengers present. For instance, the processor 130 may consider the risk factors, discussed above, relative to an intermediate threshold which indicates a less risky maneuver over or through an environmental obstacle than a maneuver that exceeds the maximum threshold. If the processor 130 determines that the risk factors are quantitatively below the maximum threshold but above an intermediate threshold, the processor 130 may determine that the environmental obstacle should only be attempted autonomously and only after the passengers have exited the host vehicle 100. In such instances, the process 400 may proceed to decision block 430. If the processor 130 determines that the risk factors are quantitatively below the intermediate threshold, the processor 130 may permit manual or autonomous operation of the host vehicle 100 through the environmental obstacle, and the process 400 may proceed to block 445.

At decision block 430, the vehicle system 105 determines whether to allow manual operation of the host vehicle 100 through the environmental obstacle. For instance, the processor 130 may determine that human operation of the host vehicle 100 is permissible if the risk factors are quantitatively below the intermediate threshold. In such instances, the process 400 may proceed to block 435. Otherwise, if the risk factors are quantitatively below the intermediate threshold, or if the occupants do not wish to manually operate the host vehicle 100 over or through the obstacle as indicated by a user input provided to the user interface 120, the process 400 may proceed to block 440.

At block 435, the vehicle system 105 may alert the occupants that manual operation of the host vehicle 100 is permitted. The processor 130 may generate the alert and command the user interface 120 to present the alert to the occupants via the user interface 120. If the driver wishes to manually operate the host vehicle 100 through or over the environmental obstacle, the process 400 may proceed to block 405. If the driver prefers for the host vehicle 100 to be autonomously navigated through or over the environmental obstacle, the driver may provide a user input to the user interface 120 indicating as much, and the process 400 may proceed to block 440.

At block 440, the vehicle system 105 may generate control signals to autonomously control the host vehicle 100 over or through the environmental obstacle. That is, the processor 130 may generate and output signals to the autonomous mode controller 140 that command the autonomous mode controller 140 to autonomously operate the host vehicle 100 over or through the environmental obstacle. The signals output by the processor 130 may define a particular path and a particular speed to be applied when navigating over or through the obstacle. The processor 130 or the autonomous mode controller 140 may generate signals to control the steering, braking, and acceleration while the host vehicle 100 is autonomously operated. The process 400 may proceed to block 405 after the host vehicle 100 traverses the environmental obstacle.

At block 445, the vehicle system 105 may alert the passengers to exit the host vehicle 100. That is, the processor 130 may generate the alert and command the user interface 120 to present the alert to the passengers. The alert may instruct the passengers to exit the host vehicle 100 and to, e.g., provide a user input to the remote device 145 when all passengers have exited the host vehicle 100 and are ready for the host vehicle 100 to autonomously traverse the environmental obstacle.

At decision block 450, the vehicle system 105 may determine whether it can begin autonomous control of the host vehicle 100. The processor 130, for instance, may decide to begin autonomous control of the host vehicle 100 after it confirms that all passengers have exited the host vehicle 100 and after it has received a user input, provided via a remote device 145 (e.g., a fob, cell phone, etc.) and transmitted to the processor 130 via the communication interface 125, instructing the host vehicle 100 to proceed autonomously. The processor 130 may determine that the passengers have exited the host vehicle 100 in accordance with signals output by an occupant detection system. If the passengers have exited the host vehicle 100 and if the user input is received, the process 400 may proceed to block 440. Otherwise, the process 400 may repeat block 450 until at least those two criteria are simultaneously met. This, therefore, is one example of a circumstance in which the autonomous operation of the host vehicle 100 may occur only after all passengers have exited the host vehicle 100.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX 20 and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A threat emitter system comprising:
    a threat emitter comprising
        a main power supply in communication with an external power source;
        a first sequencer connected to receive electrical power from the main power supply;
        a driver amp connected to receive electrical power from the main power supply;
        a second sequencer connected to receive electrical power from the main power supply;
        a main amp connected to receive electrical power from the main power supply; and
        a radio connected to receive electrical power from the main power supply;
    a three-way power supply connected to receive electrical power from the main power supply and configured to supply three distinct DC voltages;
        a mixer connected to receive electrical power from the three-way power supply;
        a synthesizer connected to receive electrical power from the three-way power supply;
        a pre-amp connected to receive electrical power from the three-way power supply; and
        at least two cooling fans connected to receive electrical power from the three-way power supply; and
    an antenna in communication with the main amp;
    a user interface in communication with the radio;
    wherein the radio is in communication with the mixer;
    wherein the mixer is in communication with the synthesizer;
    a filter in communication between the mixer and the pre-amp;
    wherein the driver amp is in communication with the pre-amp;
    wherein the first sequencer is in communication with the driver amp;
    wherein the driver amp is in communication with the main amp;
    wherein the second sequencer is in communication with the main amp; and
    a processor with access to a memory storing instructions executable by the processor, the instructions including:
        setting a waveform power (dB) to a selected value;
        setting a waveform frequency at a selected value;
        setting a waveform bandwidth at a selected value;
        setting a waveform pulse duration at a selected value; and
        setting a waveform pulse repetition interval at a selected value.

2. The threat emitter system of claim 1, further comprising a host vehicle on which the threat emitter is mounted.

3. The threat emitter system of claim 2, wherein the host vehicle is an autonomous host vehicle, the autonomous host vehicle comprising a processor with access to a memory storing instructions executable by the processor, the instructions including:
    determining that an autonomous host vehicle can traverse an environmental obstacle that includes at least one topographical feature that is a solid object or a land formation; and
    as a result of determining that the autonomous host vehicle can traverse the at least one topographical feature;
    controlling an active suspension system in accordance with the at least one topographical feature, and
    controlling the autonomous host vehicle to traverse the at least one topographical feature; and
    receiving a user input authorizing the autonomous host vehicle to traverse the at least one topographical feature.

4. The threat emitter system of claim 3, wherein the instructions for controlling the active suspension include to adjust one or more wheels of the host vehicle individually to traverse the at least one topographical feature.

* * * * *